A. P. & O. H. WAGNER.
LABELING MACHINE.
APPLICATION FILED MAR. 26, 1914.

1,123,435.

Patented Jan. 5, 1915.
8 SHEETS—SHEET 5.

Witnesses
M. Liebler
Mellie Galloway

Inventors
A. P. WAGNER &
O. H. WAGNER
By R. J. McCarty
their Attorney

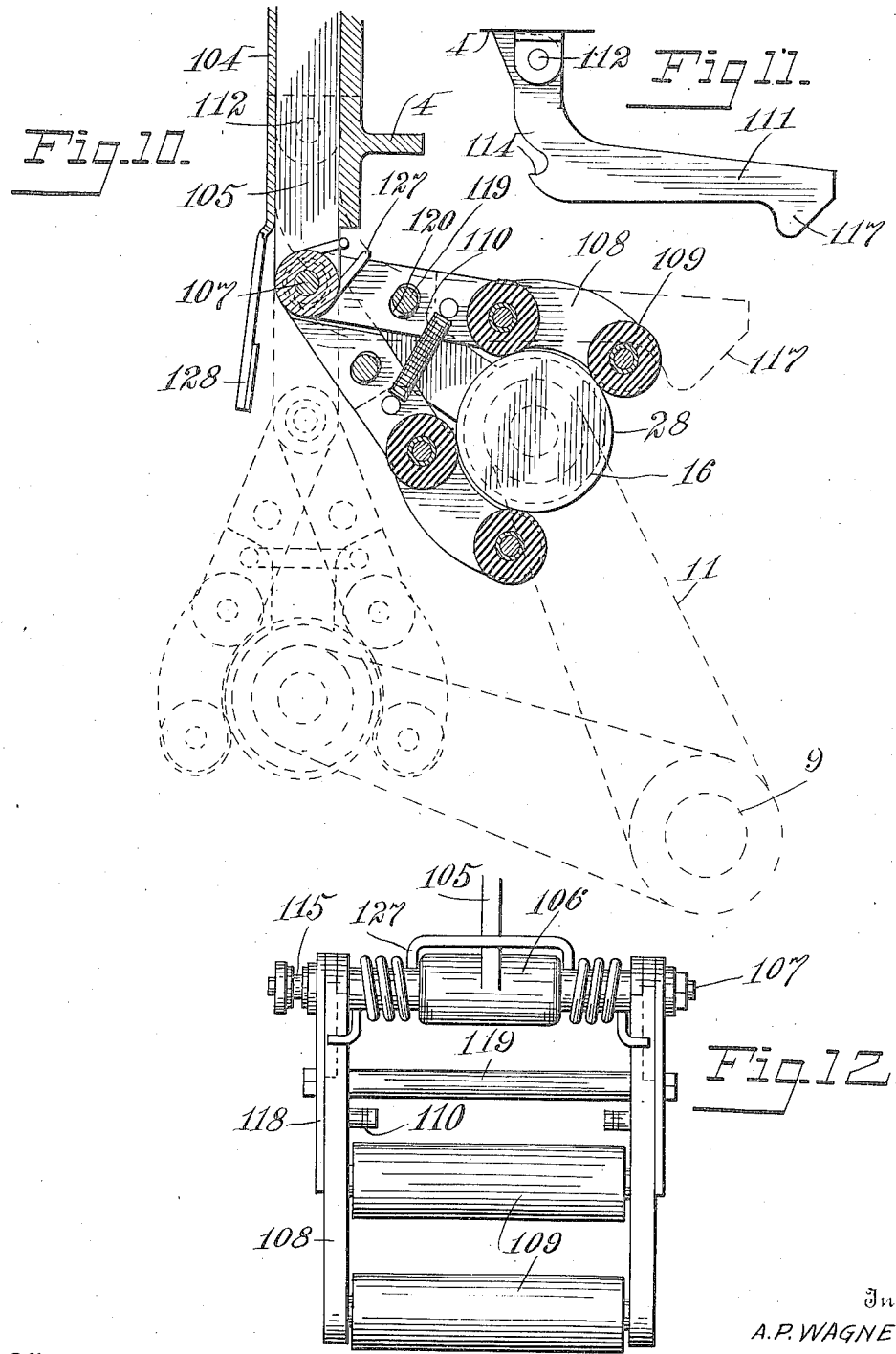

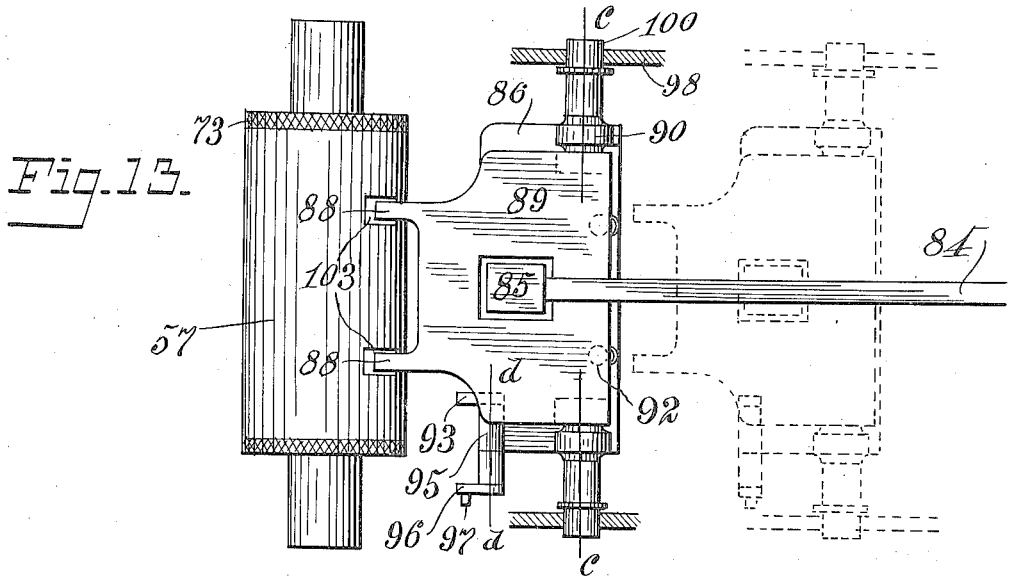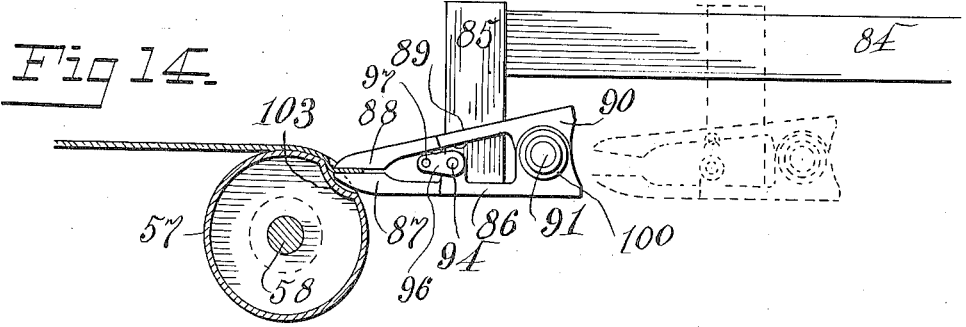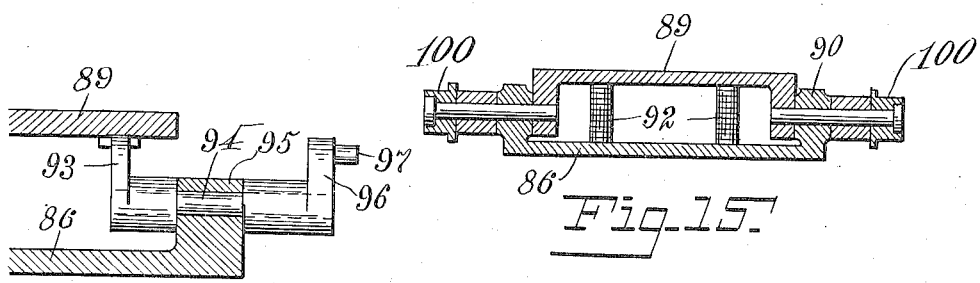

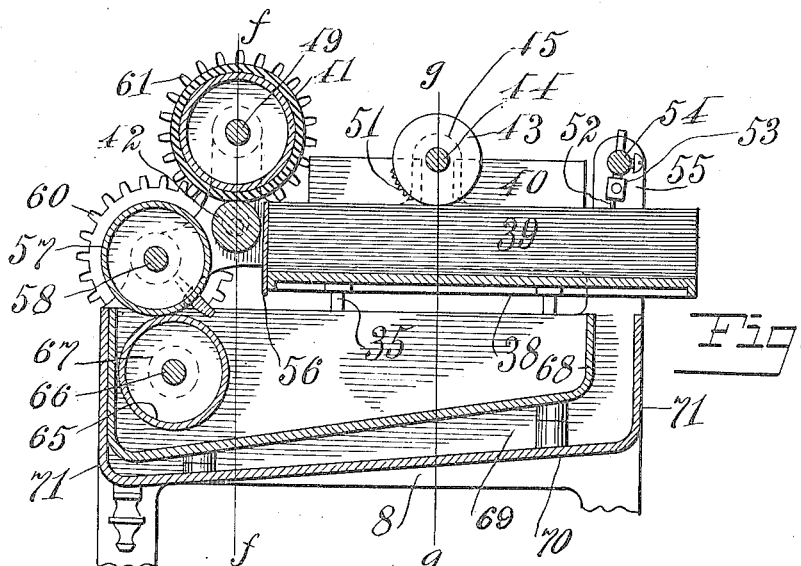
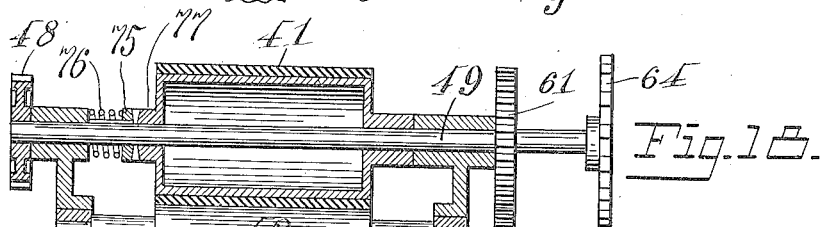
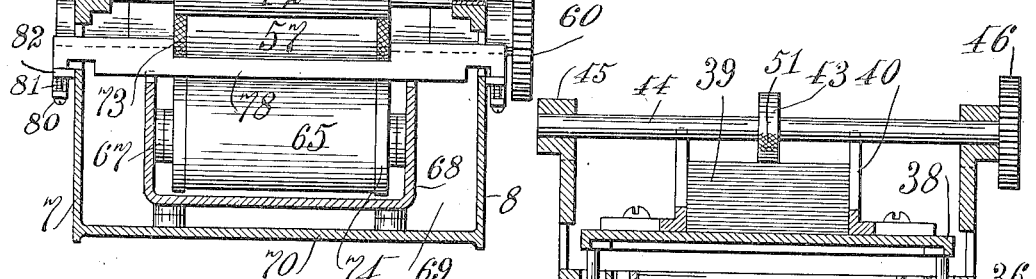
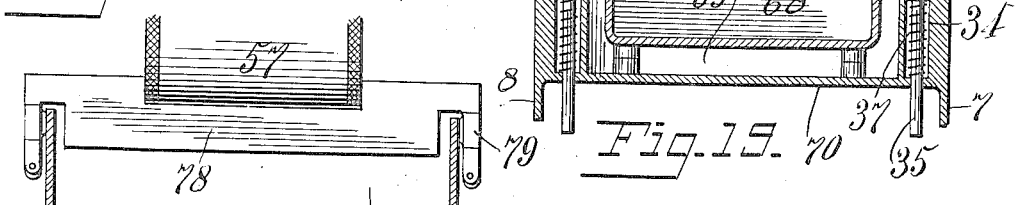

UNITED STATES PATENT OFFICE.

ALBERT P. WAGNER AND OSWIN H. WAGNER, OF NORTH DETROIT, MICHIGAN.

LABELING-MACHINE.

1,123,435.  Specification of Letters Patent.  Patented Jan. 5, 1915.

Application filed March 26, 1914. Serial No. 827,468.

*To all whom it may concern:*

Be it known that we, ALBERT P. WAGNER and OSWIN H. WAGNER, citizens of the United States, residing at North Detroit, in the county of Wayne and State of Michigan, have invented certain new and useful Improvements in Labeling-Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in can labeling machines and is an improvement over the device shown and described in our former Patent No. 1,094,349 of April 21, 1914.

The object of the present invention is to provide a can labeling machine which is simple in construction and efficient in operation.

Other objects of the invention will be more particularly described in the specification and pointed out in the claims.

Figure 1:
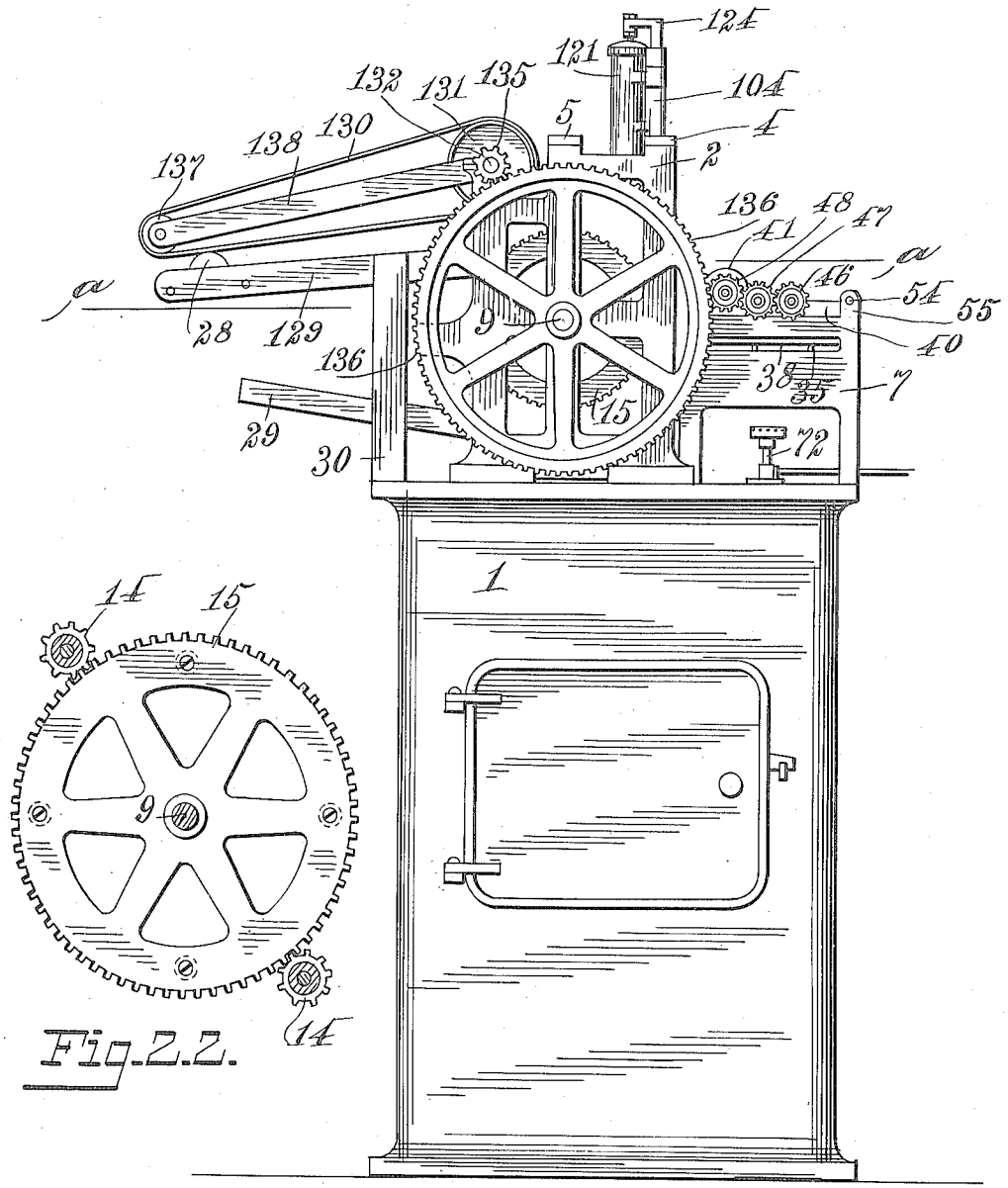
Figure 2:
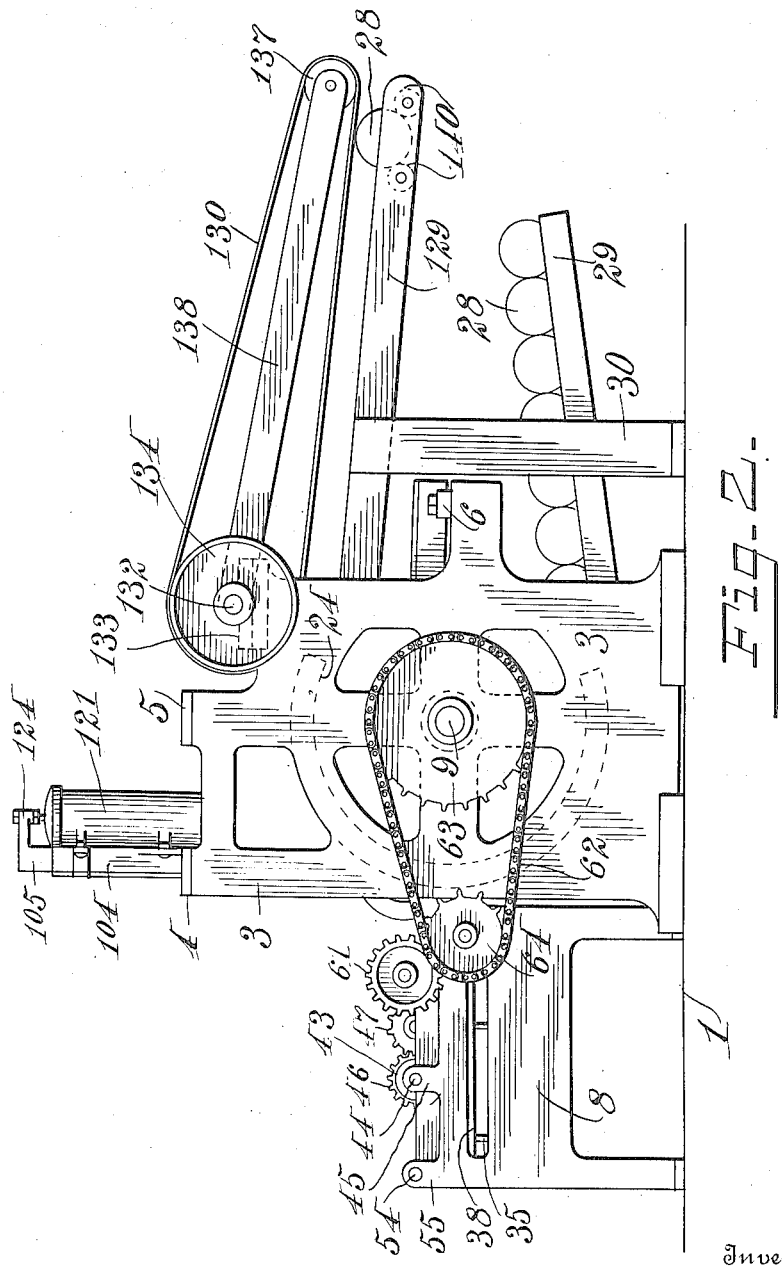
Figure 3:
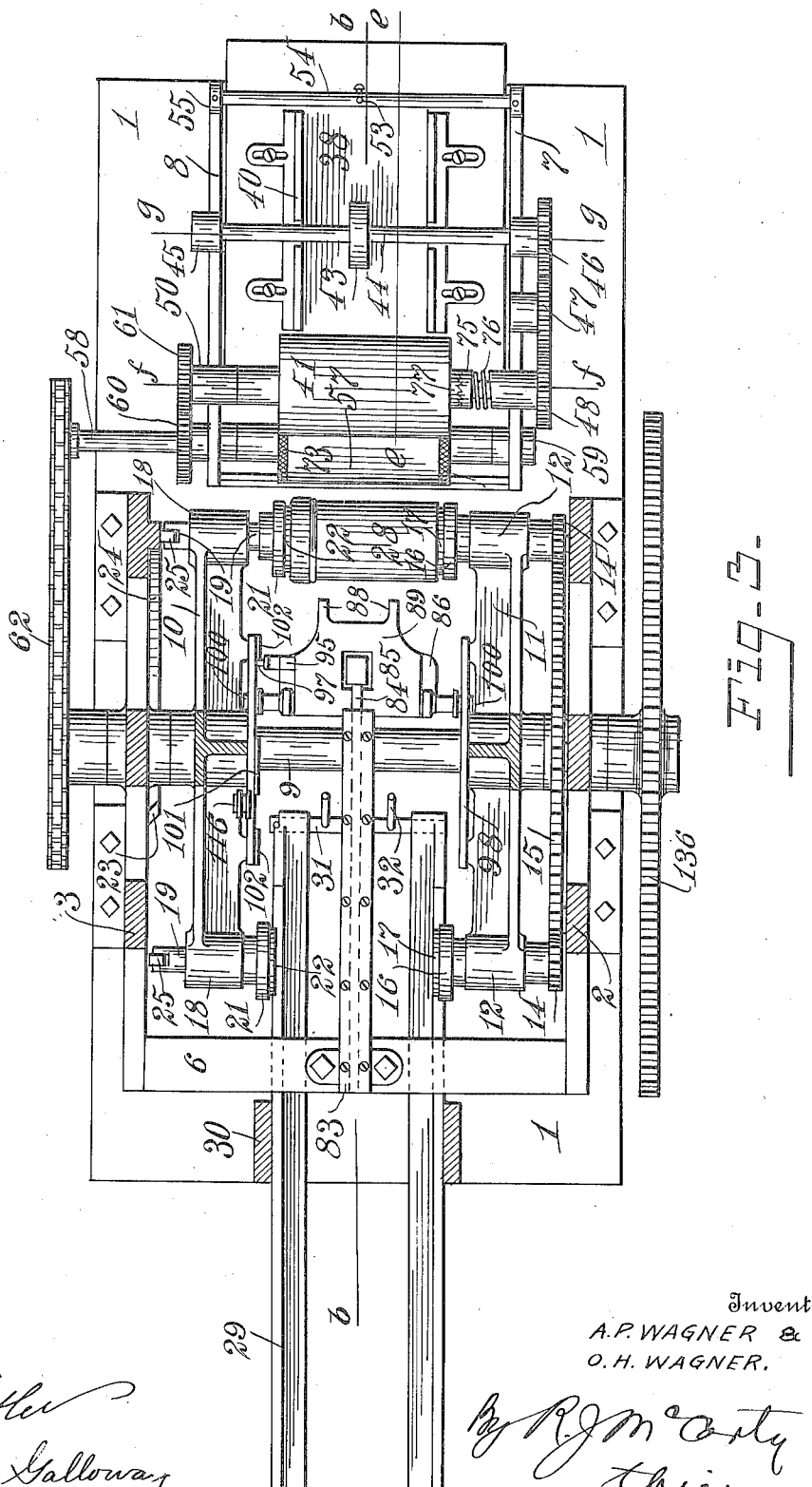
Figure 4:
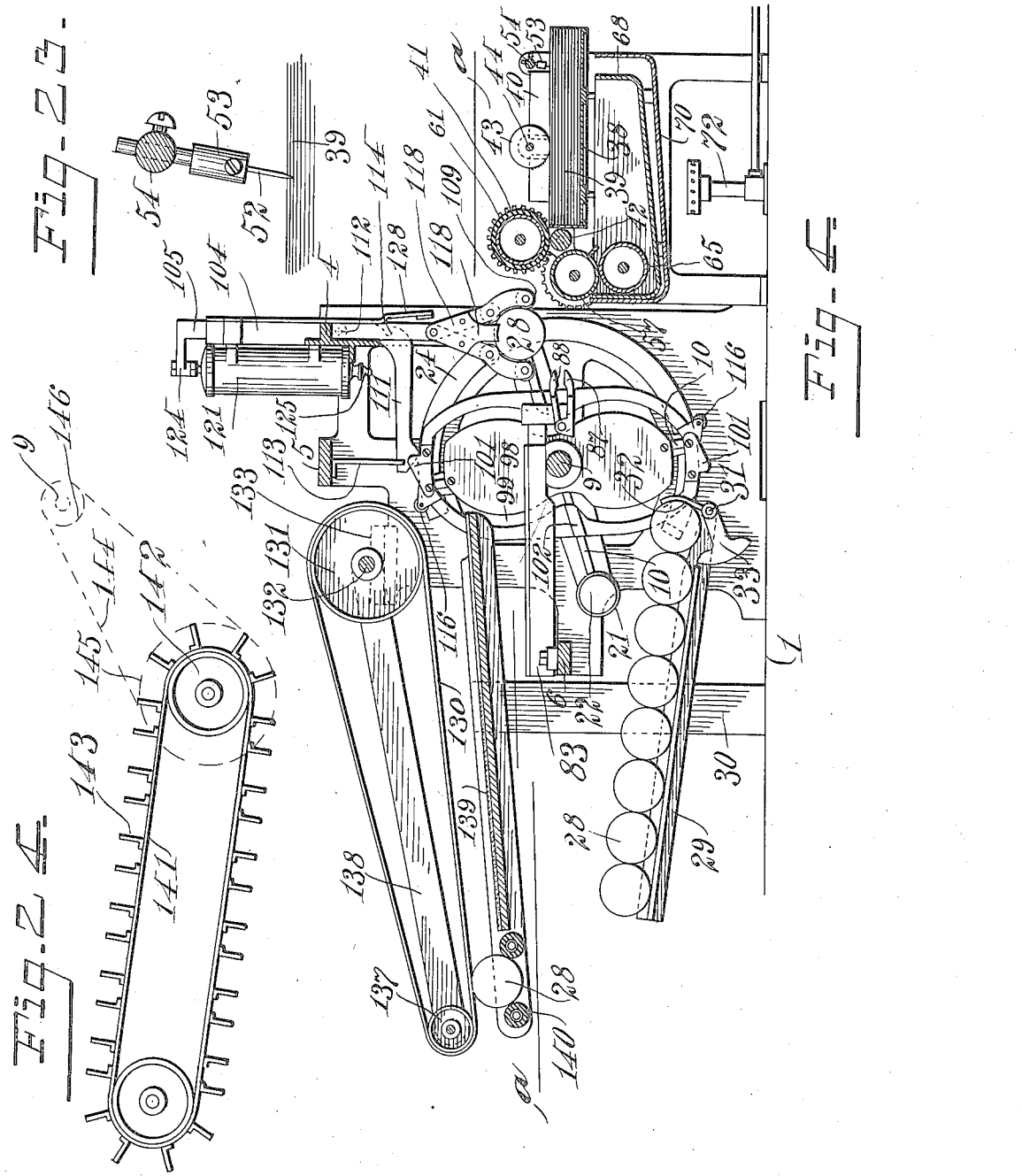
Figure 5:
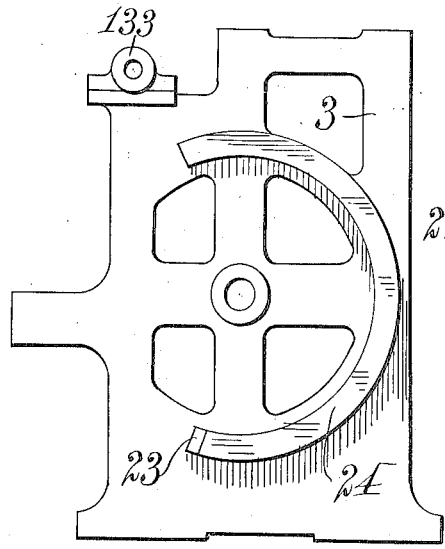
Figure 6:
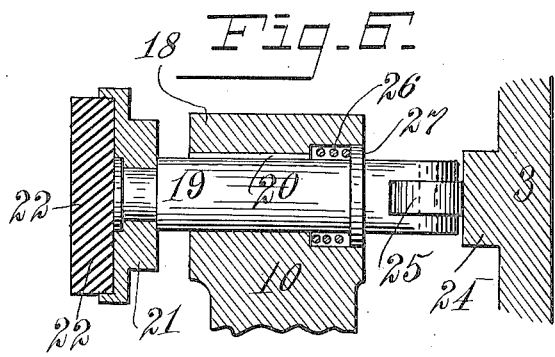
Figure 7:
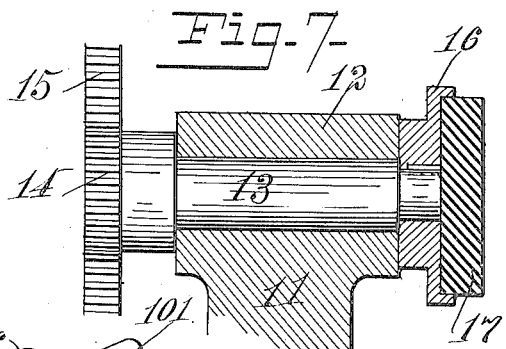
Figure 9:
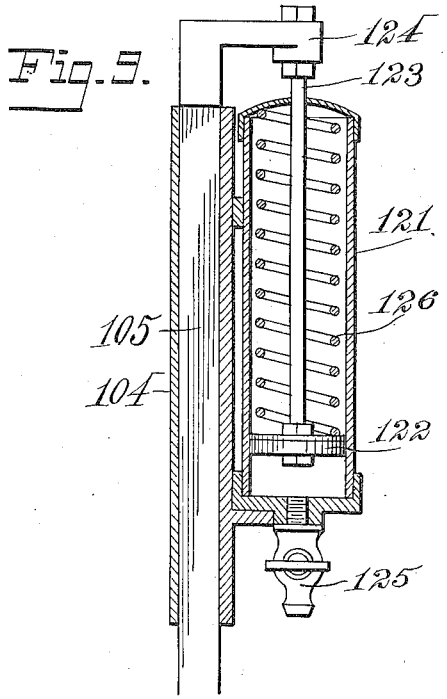
Figure 8:
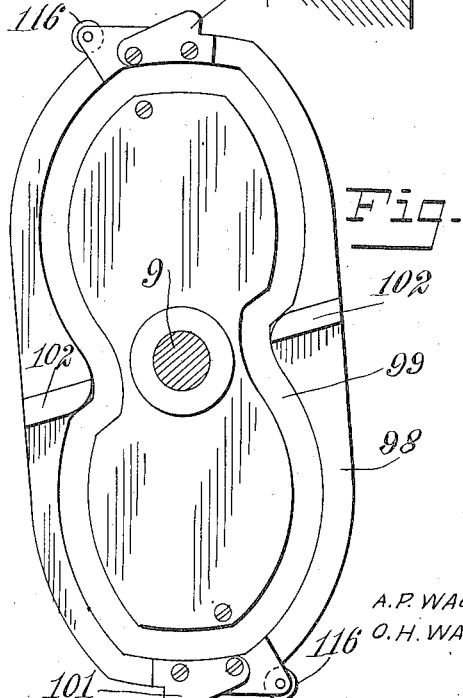

Referring to the accompanying drawings, Figure 1 is an elevation of one side of the machine; Fig. 2 is an elevation of the opposite side of the machine; Fig. 3 is a section approximately on the line a—a of Figs. 1 and 4; Fig. 4 is a section approximately on the line b—b of Fig. 3; Fig. 5 is an elevation of one of the supporting frames; Fig. 6 is a sectional view of one of the clamps which engages the cans; Fig. 7 is a sectional view of the means for rotating the cans; Fig. 8 is a detail view of the cams for actuating the label gripper; Fig. 9 is a detail sectional view of the dash pot which controls the label spreader; Fig. 10 is a detail sectional view of the label spreader; Fig. 11 is a detail view of the latch for holding the label spreader in an elevated position; Fig. 12 is a front elevation of the label spreader; Fig. 13 is a top plan view of the label gripper; Fig. 14 is a side elevation of the same; Fig. 15 is a section on the line c—c of Fig. 13; Fig. 16 is a section on the line d—d of Fig. 13; Fig. 17 is a sectional view of the label feeding mechanism on the line e—e of Fig. 3; Fig. 18 is a section on the lines f—f of Figs. 3 and 17; Fig. 19 is a section on the lines g—g of Figs. 3 and 17; Figs. 20 and 21 are detail views of the scraper for the gluing roll; Fig. 22 is a detail view of the gears for rotating the cans; Fig. 23 is a detail of the means for retaining the lower label when the uppermost label is fed to the gluing rolls; and Fig. 24 is a view showing a modified form of conveyer which is instrumental in feeding irregular shaped cans or containers into the machine.

Throughout the specification and drawings, similar reference characters indicate corresponding parts.

*Frame work,* (Figs. 1, 2 and 3.)—Mounted on a suitable base 1 which may be in the form of a cabinet, as is shown in Fig. 1, are two side frames 2 and 3 which are connected by cross members 4, 5 and 6. Also mounted on the base 1 are side frames 7 and 8 of the label feeding mechanism.

*Can-carrying mechanism,* (Figs. 3 and 4.)—Journaled in suitable bearings in the frames 2 and 3 is a shaft 9 on which spider arms 10 and 11 are secured. The spider arm 11 is provided with bearings 12 in which shafts 13 are journaled (see also Fig. 7). Mounted on one end of the shafts 13 are pinions 14 in mesh with a stationary gear 15 rigidly secured to the side frame 2 (see also Fig. 22). Also mounted on the shafts 13 are heads 16 which receive resilient pads 17, said pads 17 being adapted to engage the ends of the cans, as will hereinafter be referred to. When the spider arm 11 is rotated by the shaft 9, the pinions 14 will be rotated by the gear 15. The spider arm 10 is provided with bearings 18 in which rods 19 are slidingly mounted (see also Fig. 6). The rods 19 are prevented from being rotated by keys 20. Mounted on one end of the rods 19 are rotating heads which receive resilient pads 22 similar to the pads 17. The heads 21 are adapted to rotate on the rods 19 in unison with the heads 16. The can is received between the pads 17 and 22, and the rods 19 are moved longitudinally to clamp the cans between the pads by a cam 23 which forms the end of a race 24 attached to the side frame 3. The race 24 is shown in detail in Fig. 5. The rods 19 are provided with anti-friction rollers 25 adapted to engage the cam 23 and race 24. When one of the rollers 25 engages the cam 23 its respective pad 22 will be moved toward one of the pads 17 thereby clamping a can between said pads and holding said can between said pads as long as the anti-friction roller is in engagement with said race. The pads 22 are actuated to engage the can by the cam 23 but are actuated to release it when the roller 25 rides off of the upper end of the race 24, by means of springs 26 mounted in suitable pockets in the bearings 18 and adapted to engage collars 27 on the rods 19. The cans 28 are fed into the machine on incline tracks 29 supported by standards 30 which extend upwardly from the base 1. The tracks 29 are inclined to permit the cans to roll by gravity into the machine. The lower ends of the tracks 29 form bearings for a rock shaft 31. Extending from the rock shaft 31 are prongs 32 which engage the lowermost can and prevents the cans rolling off of the tracks. The prongs 32 are held in an elevated position by a weight 33 which is adapted to act as a stop for the second can when the prongs 32 are depressed and the first can is positively removed from the tracks 29. The lower end of the tracks 29 are mounted adjacent to the cam 23 of the race 24, consequently, during the rotation of the arms 10 and 11 the pad 22 will be moved toward the can when one of said pads is opposite the cam 23. This movement of the pad by the cam 23 grips the lowermost can between the pads 22 and 17. After being gripped between the pads 22 and 17, the can is carried upwardly by the arms 10 and 11, meanwhile being rotated by the gear 15 and pinion 14. During the upward travel of the can a label is applied thereto as follows.

*Label feeding mechanism*, (Figs. 3, 4, 17 to 21.)—Mounted on the side frames 7 and 8 are pockets 34 in which rods 35 are vertically movable. The rods 35 are provided with guide collars 36 and with springs 37 which exert an upward influence. Mounted on the upper ends of the rods 35 is a platen 38 which receives a pile of labels 39. The labels 39 are maintained in position on the platen 38 by adjustable side plates 40 and a plate 56. The uppermost label is fed forward between an upper feed roller 41 and a lower feed roller 42 by a continuously rotating disk 43. The disk 43 is mounted on a shaft 44 journaled in bearings 45. The disk 43 is driven from the upper feed roller 41 through the agency of gears 46, 47 and 48. The gear 46 is mounted on the shaft 44 while the gear 48 is mounted on a shaft 49 journaled in bearings 50 and upon which the upper feed roller 41 is mounted. The roll 41 is driven from the shaft 49 through the agency of a ratchet 75 splined to the shaft 49 influenced by a spring 76 and adapted to engage a ratchet 77 on the hub of the feed roller 41. The ratchets 75 and 77 permit the feed roller 41 to rotate ahead or faster than the shaft 49. The disk 43 is provided with serrations 51 on only a portion of its periphery and said disk is adapted to feed the label only when said serrations are in engagement with the label. To prevent the next under-lying label being fed through the agency of friction by the upper label, a pin 52 is provided (see Fig. 23 in this connection). The pin 52 is carried by a holding member 53 supported in a rod 54 mounted in lugs 55 extending from the side frames 7 and 8. The pin 52 extends through the uppermost label and penetrates the next lowermost label to an extent sufficient to retain the lower label when the upper label is fed. As the height of the pile of labels decreases, the uppermost label is maintained in contact with the disk 43 by the springs 37 which tend to elevate the platen 38. The extent of the serrations 51 are only sufficient to move the uppermost label between the feed rollers 41 and 42, which feed the label to a gluing roll 57 mounted on a shaft 58 journaled in bearings 59 on the plates 7 and 8. The shafts 58 and 49 are provided with inter-meshing gears 60 and 61. The gluing roll 57 is driven from the shaft 9 through a sprocket chain 62 which engages a sprocket wheel 63 on the shaft 9 and a sprocket wheel 64 on the shaft 58. The ratio of the sprockets 63 and 64 is such that the glue roll 57 makes two revolutions to one revolution of the shaft 9. The gluing roll 57 receives glue from an applying roller 65 mounted on a shaft 66 journaled in bearings 67 in a glue pot 68. The glue pot 68 is mounted in a water bath 69 formed by the side frames 7 and 8, a bottom plate 70 and end plates 71. The water bath may be heated by any suitable well known means such as a burner 72, shown in Figs. 1 and 4. The applying roll 65 is rotated through the agency of friction by the gluing roll 57, and to facilitate this frictional contact, the ends of the gluing roll 57 are serrated, as at 73. The applying roll 65 is provided with end flanges 74 which permit the face of the roller 65 to carry a sufficient quantity of glue and prevents the gluing roll 57 forcing the glue off of the applying roll. The flanges 74, therefore, permit a sufficient quantity of glue to pass between the rollers and to be transferred to the gluing roll. The thickness of glue on the gluing roll is regulated by a scraping plate 78 pivoted to the side plates 7 and 8 at 79. The distance the plate 78 is removed from the roll and the thickness of the glue on the roll is regulated by screws 80 and springs 81. The screws 80 enter bosses 82 on the side plates 7 and 8. The label is picked off of the gluing roll 57 and is held in a taut position to be engaged by a can by a label gripper constructed as follows.

*Label gripper*, (Figs. 3, 4 and 13 to 16.)—Supported by the shaft 9 and the cross member 6 is a guide 83 in which a rod 84 reciprocates. Mounted on one end of the rod 84 is a bracket 85 to the lower end of which is secured a plate 86 provided with fingers 87 which coöperate with fingers 88 to strip the label from the gluing roll. The fingers 88 extend from a plate 89 mounted above the plate 86. The plates 86 and 89 are provided with bearings 90 which receive pins 91 which form a pivotal connection between the plates. The fingers 87 and 88 are pressed together to grip the label by springs 92 mounted between the plates 86 and 89 on the side of the pivots 91 opposite to fingers 87 and 88. The plate 89 and the fingers 88 carried thereby are elevated and maintained in an elevated position by a latch 93 mounted on a shaft 94 journaled in a bearing 95 extending from the plate 86. The latch 93 is actuated by a crank 96 which carries a pin 97. Said pin 97 is actuated to set and to release the latch 93 to open and close the fingers 87 and 88 by means hereinafter referred to. The rod 84 and the parts carried thereby are reciprocated through the agency of cams 98 mounted on the spider arms 10 and 11. One of the cams 98 is shown in detail in Fig. 8. The cams 98 are provided with races 99, which receive rollers 100 mounted on the outer ends of the pivot pins 91. When the spider arms 10 and 11 are rotated, the label gripper, consisting of the plates 86 and 89 and the fingers 87 and 88, is reciprocated to and from the gluing roll 57. The cam 98, attached to the spider arm 10, is provided with cams 101 and 102 adapted to engage the pin 97. The cams 102 are adapted to engage the pin 97 to elevate the latch 93 and to open the fingers 87 and 88, while the cams 101 are adapted to engage the pin 97 to depress the latch 93 to release the upper plate 89 and to close the fingers 87 and 88 to grip the label. The cams 98 are adapted to move the label gripper forward an extent sufficient for the fingers 87 and 88 to pick up the edge of the label off of the gluing roll 57. The gluing roll 57 is provided with depressions 103 which permit the fingers 87 to pass under the edge of the label. By thus providing the gluing roll with depressions 103, the entire surface of the label will be covered with glue by the gluing roll. When the fingers 87 and 88 enter the depressions 103, the cams 101 engage the pins 97 thereby permitting the fingers to engage the end of the label. When the label gripper is moved away from the gluing roll by the cams 98, the label is stripped off of the gluing roll and is held taut between the fingers 87 and 88 and the feed rolls 41 and 42. The timing of the machine is such that when the label is thus held taut, a can 28 is brought up under the label by the spider arms 10 and 11. After the can comes in contact with the label the label is released by the fingers 87 and 88, the plate 89 being elevated by the latch 93 and cams 102. After the can engages the under side of the label, the label is applied to the can by a label spreading means as follows.

*Label spreading means*, (Figs. 4, 9, 10, 11 and 12.)—Mounted on the cross member 4 is a vertical guide 104 in which a rod 105 reciprocates. Mounted on the lower end of the rod 105 is a bearing 106 in which a rod or shaft 107 is journaled. Mounted on the ends of the rod 107 are arms 108 in which rollers 109 are mounted. The rollers 109 are constructed of any suitable resilient material such as rubber or the material from which inking rollers are made. The arms 108 are drawn toward each other by springs 110. The arms 108 and the rollers 109 are maintained in an elevated position by means of a latch 111 pivoted at 112 to the cross member 4. The latch 111 is guided by a bracket 113 extending from the cross member 5. The latch 111 is provided with a shoulder 114 adapted to engage a roller 115 on the end of the shaft 107. The latch 111 is actuated to permit the label spreader, consisting of the arms 108 and rollers 109, to be depressed by gravity by projections, consisting of anti-friction rollers 116, mounted on one of the cams 98. The projections 116 are adapted to engage a projection 117 on the end of the latch 111. The timing is such that one of the projections 116 releases the latch at about the time the can engages the label. When the latch 111 is actuated, the label spreader drops by gravity to the position shown in Fig. 4 in which position the rollers 109 engage the surface of the can. During the time the rollers 109 are in engagement with the can, the can is being carried upward by the arms 10 and 11 and is being rotated by the gears 14 and 15. As the can is being rotated, the label will be wrapped around the can and will be applied thereto by the rollers 109. The speed of revolution of the can is sufficient to permit the can to draw out the label before the can reaches a height above the gluing roll which would prevent the gluing roll applying glue to the label. When the label spreader falls by gravity, its movement is arrested by stop plates 118 mounted on and suspended from the rod 107. The stop plates are connected by rods 119 which pass through slots 120 in the arms 108. The rods 119 are adapted to limit the movement of the arms 108. The stop plates 118 are adapted to engage the heads 16 and 21 carried by the arms 10 and 11. The movement of the label spreader downwardly under the influence of gravity is cushioned by a pneumatic dash pot 121 mounted on the guide 104.

Mounted in the dash pot 121 is a piston 122 attached to the lower end of a piston rod 123. The upper end of the piston rod is secured to a bracket 124 which extends from the upper end of the rod 105. The dash pot 121 is provided with an adjustable air vent consisting of a valve 125 which regulates the speed at which the piston 122 and the label spreader descends. The action of gravity during the descent of the label spreader may be assisted by a spring 126 mounted in the dash pot 121 above the piston 122. When the label spreader is carried upwardly by the ascending can, the can will move the label spreader to a height sufficient for the label spreader to be engaged by the latch 111. As the can moves upwardly with the label spreader, the label spreader is rocked upon the shaft 107 and is released by the can when said can reaches an upper point of its travel. The label spreader is moved back into a normal position by a spring 127 which engages the rod 105 and the arms 108. This movement of the label spreader is arrested by a buffer 128 extending from the guide 104 and adapted to be engaged by one of the rods 120. After the can releases the label gripper, said can is carried above an off-bearer, consisting of a track 129, supported by the standards 30. The inner end of the track 129 lies opposite the upper end of the race 24, consequently, when the race 24 releases the roller 25 the pads 16 and 17 release the can which drops on the track 129. The can is rolled along the track 129 by a belt 130 which passes around a pulley 131 mounted on a main drive shaft 132. The main drive shaft is journaled in bearings 133 in the side plates 2 and 3 and is provided with tight and loose pulleys 134. The shaft 9 is driven from the main shaft 132 through a pinion 135 and a gear 136, shown in Fig. 1. The belt 130 also passes around a pulley 137 mounted on the outer end of a frame 138 sprung upon the main shaft 132. The can, after having been deposited on the track 129, is rolled along the track by the belt 130 thereby further pressing the label on the can. To facilitate this operation, the track 129 is provided with a felt cover 139. The can is rolled upon the track until it reaches rollers 140 mounted in the outer end of the track. The rollers 140 are made of any suitable resilient or compressible material and the can is forced between the said rollers by the rolling action of the can imparted thereto by the belt 130.

In the construction shown in Fig. 1, it is contemplated that the cans fed into the machine shall be cylindrical, however, the machine is adapted to apply a label to packages or containers of irregular shape. When the packages are of a shape which do not permit them to roll by gravity into the machine, a belt conveyer 141, shown in Fig. 24, is provided. The belt conveyer 141 passes around suitable pulleys 142. The belt is provided with suitable holding means 143 adapted to engage the irregular shaped container. It will be noted that the holding means 143 will be opened to release the container at a point where the belt passes around the lowermost pulley 142 and at which point the container is engaged by the pads 16 and 17 to remove the containers from the belt. In Fig. 24, we have shown holding means 143 particularly adapted for square containers but it will be understood that holding means may be provided equally adapted for other irregular shaped containers. The conveyer 141 may be driven from the shaft 9 through the agency of a belt 144 which passes around the pulley 145 and a pulley 146 on the shaft 9.

By thus constructing a can label machine, the device is particularly adapted to apply labels to cans having one end larger than the other, such as baking-powder cans provided with a cap. To apply a label neatly to a can of this type, the label must be stretched around the can. In the present machine, this operation is accomplished by the label gripper which holds the label taut and the label spreader which initially applies one end of the label to the can before the other end is released by the feeding rolls. After the label has been started straight on the can the remainder of the label will be wound evenly around the can by the rollers of the label spreader. It is to be noted that in providing the disk 43 with the serrations 51 on only a portion of the periphery of the disk an initial intermediate label feed is secured which is simple in construction and efficient in operation. Also in providing the cams 98 with their races 99, the movement of the label gripper is positive in operation.

Having described our invention, we claim:

1. In a device of the type specified, can carrying means, label feeding means, label gripping means, and a cam having a race therein mounted on said can carrying means and adapted to actuate said label gripping means.

2. In a device of the type specified, can carrying means, label feeding means, label gripping means, a cam having a race therein mounted on said can carrying means and adapted to actuate said label gripping and label spreading means under the control of said can carrying means.

3. In a device of the type specified, can carrying means, label feeding means, reciprocating label gripping means, and means carried by said can carrying means and adapted to actuate said label gripping means in both directions.

4. In a device of the type specified, can carrying means, label feeding means, reciprocating label grippers, and means carried by said can carrying means and adapted to reciprocate said label grippers in both directions and to open and close said label grippers.

5. In a device of the type specified, can carrying means, label feeding means, label gripping means, and means carried by said can carrying means and adapted to positively actuate said label gripping means.

6. In a device of the type specified, can carrying means, label feeding means, label gripping means, vertically movable label spreading means, and stops mounted on said label spreading means and adapted to engage the can carrying means to limit the downward movement of said label spreading means.

7. In a device of the type specified, can carrying means, label feeding means, reciprocating label gripping means, label spreading means, said label spreading means and said label gripping means being positively actuated by said can carrying means, and means carried by said can carrying means and adapted to release said label spreading means.

8. In a device of the type specified, can carrying means, a vertically movable slide, a guide for said slide, arms pivoted to said slide, rollers mounted on said arms, and a stop carried by said slide and adapted to engage said can carrying means.

In testimony whereof we affix our signatures, in presence of two witnesses.

ALBERT P. WAGNER.
OSWIN H. WAGNER.

Witnesses:
BEN H. COLE,
JOHN V. CARR.